US008566959B2

(12) United States Patent
Taoka

(10) Patent No.: US 8,566,959 B2
(45) Date of Patent: Oct. 22, 2013

(54) INFORMATION SECURITY APPARATUS, SECURITY SYSTEM, AND METHOD FOR PREVENTING LEAKAGE OF INPUT INFORMATION

(75) Inventor: Hiroki Taoka, Osaka (JP)

(73) Assignee: Panasonic Corporation, Osaka (JP)

( * ) Notice: Subject to any disclaimer, the term of this patent is extended or adjusted under 35 U.S.C. 154(b) by 1384 days.

(21) Appl. No.: 12/105,585

(22) Filed: Apr. 18, 2008

(65) Prior Publication Data
US 2009/0328204 A1 Dec. 31, 2009

(30) Foreign Application Priority Data

Apr. 19, 2007 (JP) ................................ 2007-110227

(51) Int. Cl.
*G06F 21/00* (2013.01)
(52) U.S. Cl.
USPC .......................................................... 726/29
(58) Field of Classification Search
USPC .......................................................... 726/29
See application file for complete search history.

(56) References Cited

U.S. PATENT DOCUMENTS

| | | | | |
|---|---|---|---|---|
| 4,868,376 | A * | 9/1989 | Lessin et al. ................. | 235/492 |
| 5,731,575 | A * | 3/1998 | Zingher et al. ............... | 235/379 |
| 7,117,284 | B2 | 10/2006 | Watt et al. | |
| 7,124,274 | B2 | 10/2006 | Watt et al. | |
| 7,149,862 | B2 | 12/2006 | Tune et al. | |
| 7,171,539 | B2 | 1/2007 | Mansell et al. | |
| 7,185,159 | B2 | 2/2007 | Beinet et al. | |
| 7,231,476 | B2 | 6/2007 | Watt et al. | |
| 7,305,534 | B2 | 12/2007 | Watt et al. | |
| 7,305,712 | B2 | 12/2007 | Watt et al. | |
| 7,325,083 | B2 | 1/2008 | Watt et al. | |
| 7,340,573 | B2 | 3/2008 | Watt | |
| 2003/0120597 | A1 * | 6/2003 | Drummond et al. ............ | 705/43 |
| 2003/0140205 | A1 | 7/2003 | Dahan | |

(Continued)

FOREIGN PATENT DOCUMENTS

| | | |
|---|---|---|
| JP | 2002-197065 | 7/2002 |
| JP | 2004-171563 | 6/2004 |

(Continued)

OTHER PUBLICATIONS

Grawrock, "The Intel Safer Computing Initiative", IntelPress, Chapter 9, 2006.

(Continued)

*Primary Examiner* — William Goodchild
(74) *Attorney, Agent, or Firm* — Wenderoth, Lind & Ponack, L.L.P.

(57) ABSTRACT

An information security apparatus and a security system, which prevent eavesdropping on input information input by an input device and identify eavesdroppers, includes a key input interface unit inputting secret information returns a decoy key input value when receiving a read access from unprotected domain 1011. Further, a payment-processing company, which judges whether it is possible or not to use a service such as electronic payment-processing, provides the information security apparatus with an immediate value to be used as the decoy key input value when performing an authentication. Accordingly, a person who attempts to eavesdrop on the input from a key input unit acquires the decoy key input value. If the decoy key input value is used when requesting payment-processing company to perform an authentication, the payment-processing company recognizes the person who requests the authentication as an eavesdropper.

20 Claims, 8 Drawing Sheets

(56) References Cited

U.S. PATENT DOCUMENTS

| | | |
|---|---|---|
| 2003/0140244 A1 | 7/2003 | Dahan |
| 2003/0140245 A1 | 7/2003 | Dahan |
| 2004/0053654 A1 | 3/2004 | Kokumai et al. |
| 2004/0105298 A1 | 6/2004 | Symes |
| 2004/0123118 A1 | 6/2004 | Dahan |
| 2004/0139346 A1 | 7/2004 | Watt et al. |
| 2004/0153593 A1 | 8/2004 | Watt et al. |
| 2004/0153672 A1* | 8/2004 | Watt et al. .................... 713/201 |
| 2004/0158736 A1 | 8/2004 | Watt et al. |
| 2004/0177269 A1 | 9/2004 | Belnet et al. |
| 2004/0181682 A1 | 9/2004 | Orino et al. |
| 2004/0187117 A1 | 9/2004 | Orion et al. |
| 2004/0260910 A1 | 12/2004 | Watt et al. |

FOREIGN PATENT DOCUMENTS

| | | |
|---|---|---|
| JP | 2004-199693 | 7/2004 |
| JP | 2005-284523 | 10/2005 |
| WO | 02/08921 | 1/2002 |

OTHER PUBLICATIONS

David Grawrock, "LaGrande Architecture SCMS-18", http://www.intel.com/technology/security/downloads/scms18-LT_arch.pdf, pp. 23-24, Sep. 2003.

* cited by examiner

FIG.4

| KEY | SCAN CODE | | USB KEY CODE |
|---|---|---|---|
| | PRESS | RELEASE | |
| ... | ... | ... | ... |
| A | 1C | F0 1C | 07 04 |
| S | 1B | F0 1B | 07 16 |
| D | 23 | F0 23 | 07 07 |
| F | 2B | F0 2B | 07 09 |
| G | 34 | F0 34 | 07 0A |
| H | 33 | F0 33 | 07 0B |
| J | 3B | F0 3B | 07 0D |
| K | 42 | F0 42 | 07 0E |
| L | 4B | F0 4B | 07 0F |
| : ; | 4C | F0 4C | 07 33 |
| ] ] | 5D | F0 5D | 07 31 |
| Enter | 5A | F0 5A | 07 28 |
| LEFT Shift | 12 | F0 12 | 07 E1 |
| Z | 1A | F0 1A | 07 1D |
| ... | ... | ... | ... |

FIG.5

| ADDRESS | R/W | ACCESS AUTHORIZATION | | CONTENTS |
|---|---|---|---|---|
| | | UNPROTECTED DOMAIN | PROTECTED DOMAIN | |
| 0x00 | R | ○ | - | READ DATA IN KEY INPUT STORAGE UNIT 1063<br>※OUTPUT IS REPLACED WITH VALUE IN DECOY IMMEDIATE STORAGE UNIT 1061 WHEN DECOY IMMEDIATE OUTPUT MODE (0x10) IS SET TO "1" |
| | | - | ○ | READ DATA IN KEY INPUT STORAGE UNIT 1063 |
| 0x04 | R | ○ | - | STATE OF INTERRUPT GENERATION<br>(FOR UNPROTECTED DOMAIN)<br>0 : NO READ REQUEST FOR ADDRESS 0x00<br>1 : READ REQUESTED |
| | | - | ○ | STATE OF INTERRUPT GENERATION<br>(FOR PROTECTED DOMAIN)<br>0 : NO READ REQUEST FOR ADDRESS 0x00<br>1 : READ REQUESTED |
| 0x08 | R/W | ○ | ○ | SETTING OF INTERRUPT ALLOWANCE<br>0 : NOT ALLOWED  1 : ALLOWED |
| 0x10 | R/W | × | ○ | SETTING OF DECOY IMMEDIATE OUTPUT MODE<br>0 : USE DECOY IMMEDIATE OUTPUT MECHANISM<br>1 : DO NOT USE DECOY IMMEDIATE OUTPUT MECHANISM |
| 0x14 | R/W | × | ○ | SETTING OF IMMEDIATE IN DECOY IMMEDIATE STORAGE UNIT<br>(FIRST STORAGE UNIT 10611) |
| 0x18 | R/W | × | ○ | SETTING OF IMMEDIATE IN DECOY IMMEDIATE STORAGE UNIT<br>(SECOND STORAGE UNIT 10612) |

○ : ACCESSIBLE,  × : ACCESS NOT ALLOWED,  − : NO DEFINITION

INFORMATION SECURITY APPARATUS, SECURITY SYSTEM, AND METHOD FOR PREVENTING LEAKAGE OF INPUT INFORMATION

BACKGROUND OF THE INVENTION (1) Field of the Invention

The present invention relates to a technology to prevent leakage of input information input by a user and identify an unauthorized user who has attempted to leak input information.

(2) Description of the Related Art

Currently, there are a number of software programs which maliciously break into computer systems in some way and cause harm to users of the computer systems.

Keyloggers are one type of the above-mentioned software programs, which collect and leak information on key input by the users.

If the leaked information is information to be kept secret such as a mail address, address, telephone number, credit card number, log-in password or the like, the users of the computer systems suffer a serious damage.

A typical example of measures against keyloggers is a logical domain separation of the resources used by the software which operate on the CPU.

Non-Patent Document 1 and Non-Patent Document 2 disclose techniques employing the domain separation.

According to Non-Patent Documents 1 and 2, software are separated into those executed in the protected domain and those executed in the unprotected domain. Generally, the software operating in the protected domain are allowed to be developed only by authorized developers. The malicious software developed by those attempting to eavesdrop are executed in the unprotected domain.

Regarding hardware, resources used by the software executed in the protected domain are isolated from the software executed in the unprotected domain. The resources include a main memory, a DMA, a debugger, I/O devices, and resources inside the CPU such as a general-purpose register, a cache, and an MMU.

The software executed in the protected domain encrypt contents of communication conducted with the hardware resources which process input from the keyboard.

Here, the key for the encrypted communication and the key input value after decryption are only placed in the hardware resources (the general-purpose register, main memory, etc.) which are logically isolated from the software in the unprotected domain.

Accordingly, while being able to eavesdrop on the encrypted text of the key input, the software in the unprotected domain are not able to decrypt the encrypted text, thus being unable to acquire the key input value.

In addition, another measure against keyloggers, which employs the domain separation, is disclosed in Patent Document 1.

According to Patent Document 1, each bus access from the CPU includes an attribute attached thereto which indicates whether or not the access has been generated by the software in the protected domain.

The hardware resources which process the input from the keyboard detect the attribute and allow accesses from the protected domain while prohibiting accesses from the unprotected domain. Consequently, the software in the unprotected domain are not able to acquire the key input value.

According to the above-mentioned conventional techniques, while improper acquisitions by the keyloggers operating in the unprotected domain can be detected and prevented, unauthorized acquirers cannot be identified.

In addition, the software programs which break into computers and operate therein such as the keyloggers generally do not have information that can be used to identify the unauthorized acquirers. Accordingly, tracking of the unauthorized acquirers require a highly-specialized expertise. If the unauthorized acquirers are not tracked, they will repeat similar attempts on different apparatuses despite failures, and as a result, improper acquisitions remain unrestrained.

Non-Patent Document 1: David Grawrock, The Intel Safer Computing Initiative, 2006, Intel Press, Chapter 9, "Protected IO".

Non-Patent Document 2: www.intel.com/technology/security/downloads/scms18-LT_arch.pdf, pp. 23-24.

Patent Document 1: Japanese Patent Application Publication No. 2004-171563.

SUMMARY OF THE INVENTION

The present invention was conceived in view of the above problems and aims to provide an information security apparatus, a security system, and a method for preventing information leakage able to prevent the improper acquisitions of input information input by the users and facilitate identification of the unauthorized acquirers.

In order to achieve the above-stated aim, the present invention provides an information security apparatus which prevents leakage of input information input by a user with use of an input device. The information security apparatus comprises a program storage unit storing a protected program and an unprotected program, a program execution unit including (i) a protected domain which is an execution environment of the protected program and (ii) an unprotected domain which is an execution environment of the unprotected program, an input receiving unit operable to receive input information from the input device and notify the program execution unit of receipt of input, a decoy information storage unit storing decoy information, a judgment unit operable to (i) acquire an acquisition request for the input information whose receipt has been notified to the program execution unit, and (ii) judge whether or not a program which has output the acquisition request is being executed in the protected domain, and an input control unit operable to, (i) if the judgment unit judges that the program is being executed in the protected domain, output the input information to the program execution unit, and (ii) if the judgment unit judges that the program is not being executed in the protected domain, output the decoy information to the program execution unit.

Here, the decoy information is particular information, for facilitating tracking of the unauthorized acquirers, is pre-specified by such as a payment-processing company which processes payment using the input information and an investigation group which investigates the improper acquisitions using the input information by, for example, tracking the identities of the unauthorized acquirers.

According to the stated structure, the information security apparatus of the present invention is able to prevent the unauthorized program executed in the unprotected domain from receiving the input information. In addition, it is also possible to make the unprotected program, which outputs the acquisition request to acquire the input information in the same manner as the protected program, acquire the decoy information instead of the input information.

Additionally, in a case where the input information is information used for payment-processing, payment-processing organizations or the like accumulate the information on those who request payment-processing and the decoy information in a form of database.

Also, if the decoy information is used in the payment-processing, etc., the organizations or the like can recognize, with use of the data base, that the payment-processing is requested using the decoy information. In this case, the organizations or the like can take countermeasures to identify the unauthorized user.

Here, the input information may be a string of characters, the decoy information includes a plurality of decoy values which are arranged in a predetermined order, the input receiving unit notifies the program execution unit of the receipt of input upon receiving each of the characters included in the input information, one of a protected program and an unprotected program, which is being executed by the program execution unit, outputs the acquisition request upon receiving each notification from the input receiving unit, and the input control unit, (i) if the judgment unit judges that the program is being executed in the protected domain, outputs one character included in the input information to the program execution unit in an input order, and (ii) if the judgment unit judges that the program is not being executed in the protected domain, outputs one of the decoy values to the program execution unit in accordance with the predetermined order.

According to the stated structure, the program being executed by the program execution unit follows processes of sending the acquisition request upon receiving the notification. This makes it possible to make the unauthorized program, which follows the same processes the protected program follows to acquire a character, acquire the decoy value instead of the character.

Here, if consecutive characters in the received information are a predetermined combination indicating an input cancellation, the input receiving unit may further notify the program execution unit of the receipt of input a number of times equivalent to a number of remaining decoy values, which have not been output, among the decoy values in the decoy information.

According to the stated structure, even in a case where input of input information by the user is cancelled in the middle, the information security apparatus can make the unauthorized software in the unprotected domain (i) follow the regular procedure for the unauthorized software to acquire the input information and (ii) acquire the entire decoy information.

The above-described information security apparatus may further comprise an additional information storage unit storing additional information which is irrelevant to the decoy information. Here, if the received input information includes a control character and a total number of characters in the input information has surpassed a number of the decoy values included in the decoy information, the input control unit outputs the additional information in accordance with the acquisition request.

According to the stated structure, even in a case where the total number of characters in the input information exceeds the number of the decoy values included in the decoy information, the security information apparatus makes the unprotected program acquire the decoy information and the additional information. Accordingly, it is possible to make the unprotected program recognize the decoy information, which, in this case, is the acquired information excluding the irrelevant particular control characters, as meaningful information.

Here, the input device may be a keyboard, each of the characters is a value corresponding to a key, of the keyboard, pressed by the user, and the decoy information is particular information used to identify an unauthorized user.

According to the stated structure, the information security apparatus is able to prevent the input information input from the keyboard from being acquired and leaked by the unprotected program.

The program execution unit and the judgment unit may be connected to each other via a bus, the program execution unit attaches attribute information to each predetermined transmission data unit of communication data before transmitting the communication data to the judgment unit, the attribute information indicating whether or not a program being executed is executed in the protected domain, and the judgment unit determines that the program which has output the acquisition request is being executed in the protected domain if, at a time of acquiring the acquisition request, the attribute information indicates that the program is being executed in the protected domain.

According to the stated structure, the judgment unit judges for each predetermined transmission data unit of a signal whether or not the signal is transmitted under control of a program having an access authority. Consequently, whether the program being executed has the access authority or not can be judged more accurately.

When transmitting communication data using the bus, the program execution unit and the judgment unit may scramble the communication data and the attribute information in an integral manner.

According to the stated structure, it is possible to prevent the attribute information from being altered while flowing through the bus, improving security as a result.

The judgment unit may further receive, from the program execution unit, a write request of new decoy information and, upon receiving the write request, judge whether or not a program being executed by the program execution unit is executed in the protected domain, and the input control unit, (i) if the program being executed by the program execution unit is judged to be executed in the protected domain at a time of receipt of the write request, further stores the received new decoy information in the decoy information storage unit, and (ii) if the program being executed by the program execution unit is judged to be not executed in the protected domain at a time of receipt of the write request, abandons the received new decoy information.

According to the stated structure, only the protected program is allowed to update the decoy information. Consequently, the decoy information can be securely updated.

The input control unit may further (i) hold output selection information indicating whether information to be output is able to be replaced or not, (ii) allow only the program execution unit, which is executing the program in the protected domain, to change contents of the output selection information, and (iii) if the contents of the output selection information indicates that output is able to be replaced, output the input information instead of the decoy information.

According to the stated structure, the input control unit can be controlled to output either the decoy information or the input information.

The protected program may include an instruction code which performs a control such that (i) if the input information is secret information which needs to be isolated from the unprotected program, the protected program writes the output selection information indicating that the output is not replaceable, and (ii) if the input information is not secret information, the protected program writes the output selection information indicating that the output is replaceable, and the program execution unit writes the output selection information to the input control unit in accordance with the protected program.

According to the stated structure, it is possible to select and control which of the decoy information and the input information the protected program is to acquire.

The above-described information security apparatus may further comprise a user interface which, if the judgment unit determines that the program is not being executed in the protected domain, indicates that the acquisition request is output by the unprotected program.

According to the stated structure, it is possible to alert the user by indicating that the unprotected program is attempting to read the input information.

The program execution unit may (i) include a switching mechanism for switching between the protected domain and the unprotected domain temporally and (ii) execute a program in accordance with the domain switched to, and in a case where a destination of the output is not the program which has output the acquisition request, the input control unit performs the output upon resumption of execution of the program which has output the acquisition request.

According to the stated structure, the program execution unit switches between the protected domain and the unprotected domain temporally. This enables the protected domain and the unprotected domain to share hardware resources, thereby improving use efficiency of the hardware resources, while securely preventing the unprotected program from acquiring the input information.

The protected program may be pre-authenticated, the program execution unit includes a protecting mechanism for preventing the unprotected domain from using particular resources, the protected program uses at least the particular hardware resources, and the unprotected domain uses a hardware resource other than the particular hardware resources, and the input control unit, when outputting the input information, outputs the input information to the particular hardware resources.

The particular hardware resources may include a particular general-purpose register, a particular cache memory, and a particular Translation Look-aside Buffer.

According to the stated structure, important hardware resources can be isolated from the program executed in the unprotected domain, which improves security, and the program execution unit securely prevents the unprotected program from acquiring the input information.

In order to achieve the above-stated aim, the present invention also provides a security system including an information security apparatus and an online service providing apparatus, the information security apparatus preventing leakage of input information input by a user with use of an input device, and the online service providing apparatus judging, based on authentication information received from the information security apparatus, whether to be able to provide an online service or not. Here, the information security apparatus includes a program storage unit storing a protected program and an unprotected program, a program execution unit including (i) a protected domain which is an execution environment of the protected program and (ii) an unprotected domain which is an execution environment of the unprotected program, an input receiving unit operable to receive input information from the input device and notify the program execution unit of the receipt of input, a decoy information storage unit storing decoy information, a judgment unit operable to (i) acquire an acquisition request for the input information whose receipt has been notified to the program execution unit and (ii) judge whether or not a program which has output the acquisition request is being executed in the protected domain, an input control unit operable to, (i) if the judgment unit judges that the program is being executed in the protected domain, output the input information to the program execution unit, and (ii) if the judgment unit judges that the program is not being executed in the protected domain, output the decoy information to the program execution unit, and a communication unit operable to transmit, to the online service providing apparatus, information which is output as the authentication information by the input control unit, and the online service providing apparatus, (i) if receiving the input information as the authentication information, provides the online service, and (ii) if receiving the decoy information as the authentication information, does not provide the online service.

According to the stated structure, the security system is able to prevent the unauthorized user from gaining the authentication based on the improperly acquired input information and utilizing the online service.

The above-mentioned online service providing apparatus further generates new decoy information and transmits the new decoy information to the information security apparatus via a secure communication, the communication unit receives the new decoy information via the secure communication, and the program execution unit writes the new decoy information as decoy information to the decoy information storage unit in accordance with the protected program.

According to the stated structure, the online service providing apparatus is able to securely update the decoy information stored in the decoy information storage unit of the information security apparatus to a desired value.

The above-described online service providing apparatus further (i) includes an unauthorized terminal storage unit storing, if the online service providing apparatus receives from an external apparatus other than the information security apparatus the decoy information as the authentication information, information on the external apparatus, and (ii) rejects to provide the online service to the external apparatus.

According to the stated structure, the security system is able to accumulate information on an unauthorized terminal apparatus.

The above-described security system may further comprise an investigation apparatus related to an investigative organization which identifies an eavesdropper, and here, the online service providing apparatus transmits the information stored in the unauthorized terminal storage unit to the investigation unit.

According to the stated structure, the security system is able to provide information on the unauthorized terminal apparatus to the investigative apparatus.

The above-described online service may include payment-processing of electronic commerce.

According to the stated structure, improper payment-processing of electronic commerce can be prevented.

In order to achieve the stated aim, the present invention also provides a method for preventing leakage of input information input by a user with use of an input device, the method being used by an information security apparatus. Here, the information security apparatus comprises a program storage unit storing a protected program and an unprotected program, a program execution unit including (i) a protected domain which is an execution environment of the protected program and (ii) an unprotected domain which is an execution environment of the unprotected program, and a decoy information storage unit storing decoy information. The method for preventing leakage of input information comprises an input receiving step of receiving input information from the input device and notifying the program execution unit of receipt of input, a judging step of (i) acquiring an acquisition request for the input information whose receipt has been notified to the program execution unit and (ii) judging whether or not a program which has output the acquisition request is being executed in the protected domain, and an input controlling step of, (i) if the judging step judges that the program is being executed in the protected domain, outputting the input information to the program execution unit, and (ii) if the judging step judges that the program is not being executed in the protected domain, outputting the decoy information to the program execution unit.

According to the stated structure, the above-mentioned method is able to prevent the unauthorized program executed in the unprotected domain from acquiring input information. In addition, it is possible to make the unprotected program, which outputs the acquisition request to acquire the input information in the same manner as the protected program, acquire the decoy information instead of the input information.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows examples of key codes used by the keyboard input interface unit of the embodiment of the present invention;

FIG. 5 shows an example of an I/O address map of the keyboard input interface unit of the embodiment of the present invention;

DESCRIPTION OF THE PREFERRED EMBODIMENT

1. Structure of Security System

Figure 1:
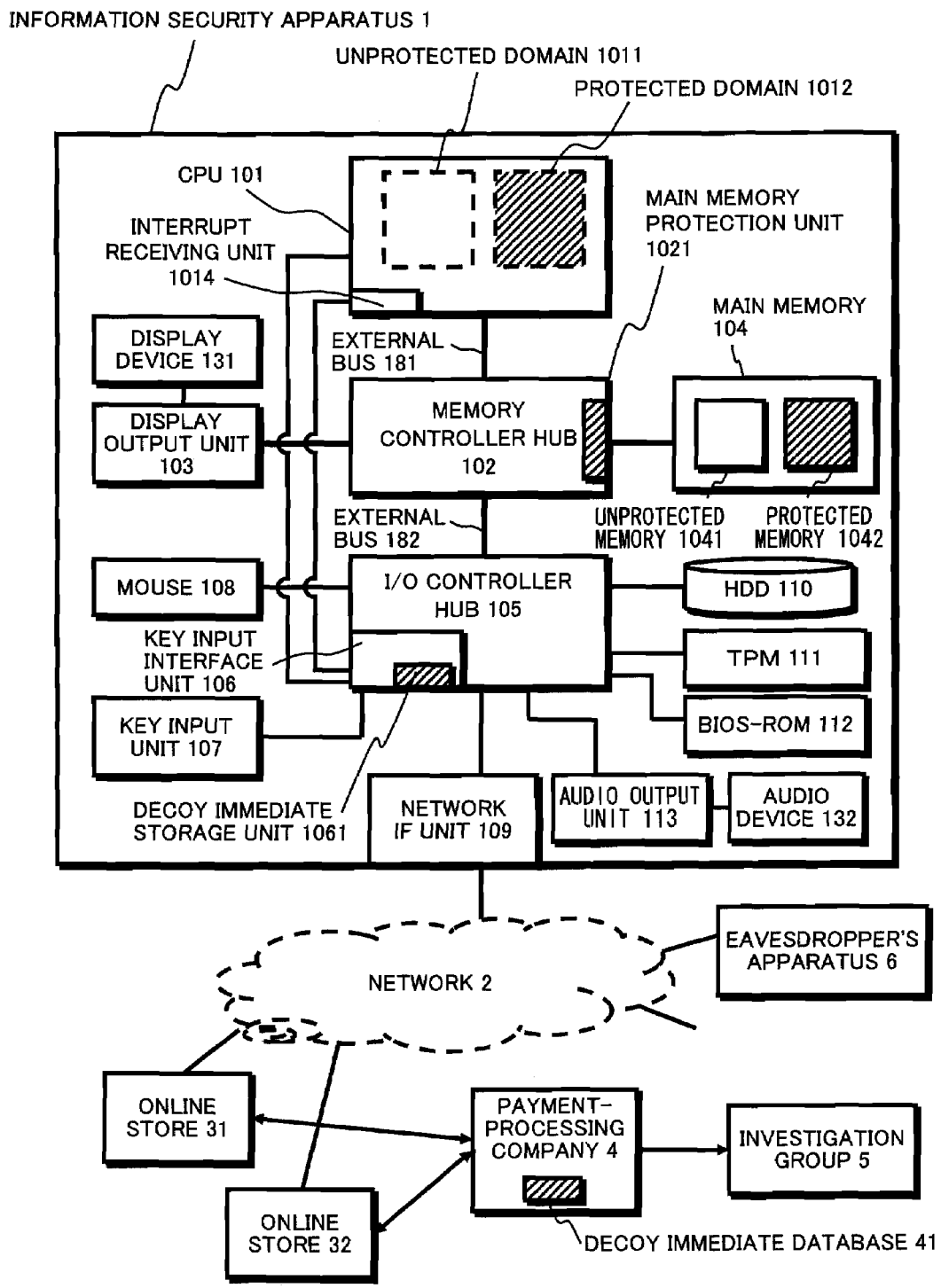
FIG. 1 shows a structure of an embodiment of the present invention.

FIG. 1 shows a structure of a security system of an embodiment of the present invention.

The security system includes an information security apparatus 1, a payment-processing company 4, an investigation group 5, an online store 31 and an online store 32.

The online store 31 is a server apparatus which provides services, sells products, etc., via a network. Upon completion of a contract with a customer to provide services, sell products, or the like, the online store 31 receives payment information required for processing the payment, such as the number and the expiry date of a credit card of the customer and the birthday of the customer, from a customer terminal via the network.

The online store 31 transmits the payment information to the payment-processing company 4 to which the online store 31 is connected via a dedicated line.

The payment-processing company 4 is a server apparatus which receives the payment information and processes procedures to charge the customer's bank account for the payment of the purchased product and the like using the payment information.

The investigation group 5 is a server apparatus which identifies a customer terminal transmitting improper payment information. The investigation group 5 acquires information, including the improper payment information, required for investigation from the payment-processing company 4 to which the investigation group 5 is connected via a dedicated line.

The online store 32, which is a server apparatus equivalent to the online store 31, offers services and products different from the online store 31.

The information security apparatus 1 is a terminal owned by the customer who uses services provided online such as e-commerce or buys products online.

Details of the information security apparatus 1 will be described later.

An eavesdropper's apparatus 6 which attempts to improperly read personal information or the like such as the payment information may be connected to the network 2.

In the above-mentioned security system, when an attempt is made to improperly read the payment information in the information security apparatus 1, the information security apparatus 1 transmits decoy information, instead of the payment information, to the eavesdropper's apparatus 6 in order to identify the improperly used terminal.

It should be noted here that the decoy information is particular information pre-specified by the payment-processing company 4, the investigation group 5 or the like so as to facilitate tracking of the identity of an unauthorized user such as a person attempting to improperly read and use the payment information.

When the eavesdropper's apparatus 6 requests the payment-processing company 4 to process payment based on the decoy information, the payment-processing company 4 identifies the eavesdropper's apparatus 6, which is the improperly used terminal, using the decoy information and a decoy immediate database 41.

In the following, details of the security system will be described with a focus on the information security apparatus 1, which is the major part of the present invention.

1.1 Structure of Information Security Apparatus 1

The information security apparatus 1 includes a CPU 101, a memory controller hub 102, an I/O controller hub 105, and a main memory and a group of various I/O devices which are connected to the memory controller hub 102 or the I/O controller hub 105.

The CPU 101 includes a CPU (Central Processing Unit) core.

The CPU core includes hardware resources such as a general-purpose register, a cache, and a TLB (Translation Lookaside Buffer).

Here, in order to describe the CPU 101, the concept of domains, which are an environment for executing software, is used.

The CPU 101 has two software execution environments which are an unprotected domain 1011 and a protected domain 1012, and the CPU core temporally switches between the domains which time-share the same resource, for example, as follows: the unprotected domain 1011→the protected domain 1012→the unprotected domain 1011.

The domains are clearly distinguished from each other, and thus, software executed in the unprotected domain cannot access any contents of the general-purpose register, the cache, and the TLB, which have been used by software executed in the protected domain.

Specifically, contexts and the like of the general-purpose register, the cache, and the TLB which are the hardware resources of the CPU core are saved/restored by hardware or low-level software so that operations of the software in one domain do not affect operations of the software in the other domain.

In the protected domain 1012, a limited group of software pieces which require a high-level security are executed. Accordingly, as will be described later, it is possible to guarantee integrity (not falsified by a third party) of the software operating in the protected domain.

On the other hand, in the unprotected domain 1011, a widely-used operating system such as Windows or Unix and applications thereof operate, and thus, malicious software such as keyloggers may break in.

The interrupt receiving unit 1014 detects when any device on the information security apparatus 1 in FIG. 1 generates an interrupt to the CPU 101, and notifies the CPU 101 of a cause of the interrupt.

Causes of interrupts generated on the CPU 101, which are managed by the interrupt receiving unit 1014, are appropriately separated for the unprotected domain 1011 and the protected domain 1012, respectively. Otherwise, if a cause of an interrupt to the protected domain 1012 has been altered by the unprotected domain 1011, a trigger for the software operating in the protected domain will be deleted.

The interrupt is used as a trigger for operations of the software in the unprotected domain 1011 and the protected domain 1012.

The main memory 104 is the main memory used by all software pieces executed on the CPU 101 and includes an unprotected memory 1041 and a protected memory 1042.

The unprotected memory 1041 is accessible from all the domains and other I/O devices (for example, a display output unit 103) on the CPU 101.

On the other hand, the protected memory 1042 is accessible only from the protected domain 101 of the CPU 101. Command codes of the protected domain 1012 are allocated only in the protected memory 1042 and are executed without being altered by the unprotected domain 1011.

The display output unit 103 acquires an image stored on the main memory 104 and outputs it to a display device 131.

The memory controller hub 102 is a hub which relays accesses among the CPU 101, the display output unit 103, the main memory 104, and the I/O controller hub 105, and is generally called "North Bridge".

The memory controller hub 102 includes a main memory protection unit 1021 which realizes access restriction so that the protected memory 1042 is accessible only from the protected domain 1012.

The I/O controller hub 105 is a hub performing (i) access relaying between the CPU 101, which is accessed via the memory controller hub 102, and the I/O devices, and (ii) DMA (Direct Memory Access) between the I/O devices and the main memory 104, and is generally called "South Bridge".

The I/O devices connected to the I/O controller hub 105 include a key input unit 107, a mouse 108, a network IF unit 109 which is an interface to the network 2, an HDD (Hard Disk Drive) 110 which is used as a secondary storage of the information security apparatus 1, a TPM (Trusted Platform Module) 111, a BIOS-ROM (Basic Input/Output System- Read Only Memory) 112, an audio output unit 113 transferring audio data to an audio device 132 which outputs audio to the user, and the like.

The TPM 111 is a device which strengthens security of the information security apparatus 1.

The TPM 111 mainly detects a state of integrity of the OS, applications and the like and stores the detected results. Also, The TPM 111 securely stores keys used for an encryption operation such as RSA (Rivest Shamir Adleman) code or SHA-1 (Secure Hash Algorithm 1) and executes the encryption operation using the keys.

Since the TPM 111 detects the state of integrity of a command stored in the protected memory and executes the command only when the integrity is guaranteed, a command in the protected domain 1012 is not executed if being altered by the software in the unprotected domain 1011.

The BIOS-ROM 112 is a device which stores the first BIOS to be executed by the CPU 101 upon power-on or reset of the information security apparatus 1.

The BIOS executes processing such as loading of the operating system from the HDD 110 to the main memory 104 after performing initialization of the devices of the information security apparatus 1.

The BIOS, an important software piece as it operates first in the information security apparatus 1, is subject to the integrity check executed by the TPM 111.

The key input unit 107 is a device such as a keyboard used when the user enters characters or requests an operation (for example, power-on) to the information security apparatus 1.

The key input interface unit 106 is an interface which processes information input from the key input unit 107 when necessary and outputs the information to the CPU 101.

Figure 2:
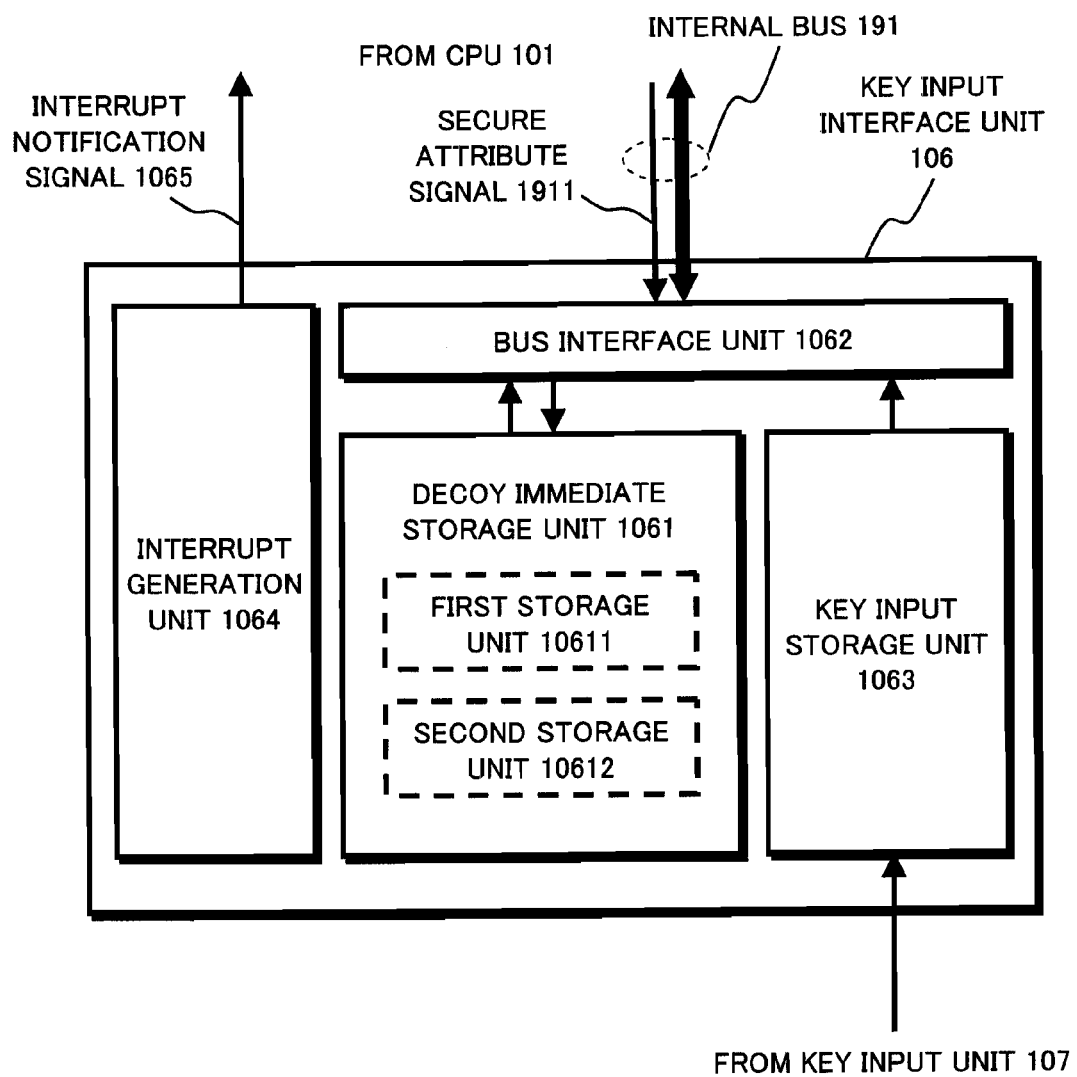
FIG. 2 shows an example of a keyboard input interface unit of the embodiment of the present invention.

FIG. 2 shows details of the key input interface unit 106.

The key input interface unit 106 includes a decoy immediate storage 1061, a bus interface unit 1062, a key input storage unit 1063, and an interrupt generation unit 1064.

The key input interface unit 106 includes an I/O port used for reading and writing data. The I/O port is assigned addresses.

FIG. 5 shows an example of an I/O address map of the key input interface unit 106.

An address 0x00 is assigned to the key input storage unit 1063.

That is to say, information stored in the key input storage unit 1063 can be read by reading the address 0x00 of the key input interface unit 106.

An address 0x14 is assigned to a first storage unit 10611. Accordingly, an immediate value to be stored in the first storage 10611 of the decoy immediate storage unit 1061 can be set by writing to the address 0x14 from the protected domain.

An address 0x18 is assigned to a second storage unit 10612, and an immediate value to be stored in the second storage unit 10612 of the decoy immediate storage unit 1061 can be set by writing to the address 0x18 from the protected domain.

It should be noted that the addresses 0x14 and 0x18 are not allowed to be accessed from the unprotected domain.

An address 0x10 is assigned to a register which stores a decoy immediate output mode of the key input interface unit 106.

If the decoy immediate output mode is set to "1", when there is a request from the unprotected domain to read the address 0x00, the read value is replaced with the value stored in the decoy immediate storage unit 1061 and the resulting value is output.

If the decoy immediate output mode is set to "0", when there is a request from the protected domain to read the address 0x00, the read value is output as it is.

The above-mentioned access restriction is executed based on the address and secure attribute instructed to the bus interface unit 106 using an internal bus 191.

The bus interface unit 1062 communicates with bus masters such as the CPU 101 via the internal bus 191 which is an internal bus of the I/O controller hub 105.

One of the signals transmitted using the internal bus 191 is a secure attribute signal 1911 attached by the CPU 01 to each access. Whether or not an access from the CPU 101 is from the protected domain 1012 can be judged by referring to the secure attribute signal 1911.

Figure 3:
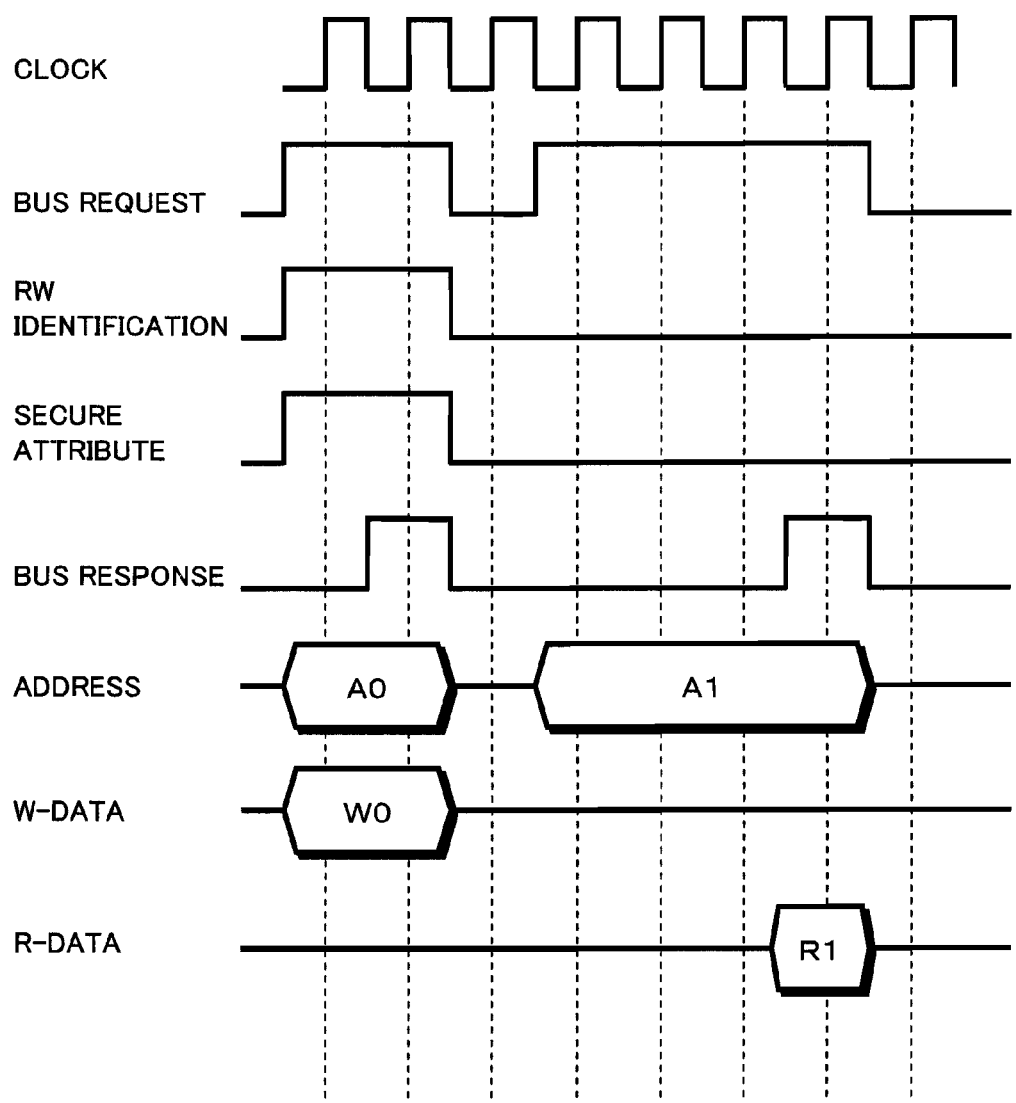
FIG. 3 shows an example of a protocol of a bus to which the keyboard input interface unit of the embodiment of the present invention is connected.

FIG. 3 shows an example of clock synchronization type communication signals sent, using the internal bus 191, between the bus interface unit 1062 which is a bus slave and the CPU 101 which is a bus master.

A bus request signal is a signal set to HIGH when the bus master transmits a signal.

The bus master outputs an RW identification signal, the secure attribute signal 191, and an address while setting the bus request signal to HIGH at the same time.

The bus slave including the key input interface unit 106, upon detection of the bus request signal being set to HIGH, sets a bus response signal to HIGH and reads the RW identification signal simultaneously.

If the RW identification signal is HIGH, which indicates a write access, the bus slave receives W-data (write data). If the RW identification is LOW, which indicates a read access, the bus slave outputs data, which is to be notified to the bus master, as R-data.

Next, the bus slave sets the bus response signal to LOW. Following that, the bus master sets the bus request signal to LOW, which completes a string of communication.

In the string of communication, the secure attribute signal 1911, when set to HIGH, indicates that the access is made from the protected domain 1012, and when set to LOW, indicates that the access is made from the unprotected domain 1011 or a bus master other than the CPU 101.

It should be noted that the signals in FIG. 3 show examples of a write access from the protected domain 1012 and a read access from the unprotected domain 1011.

The key input storage unit 1063 stores information, which is transmitted from the key input unit 107, on keys selected by the user.

Normally, this information is transmitted every time the user presses or releases a key. However, if the same key is held down for a long period of time, the information is transmitted repeatedly at an interval.

FIG. 4 shows correspondence between keys from which the key input unit 107 receives input, and two kinds of codes corresponding to these keys.

One of the two kinds of codes is a scan code used by PS/2 keyboards while the other code is a USB key code used by USB key boards.

When the scan code is used, information of a key being pressed or released (the state of the key has changed) is transmitted. The scan code which is transmitted when a key is being pressed is called a make code, while the scan code which is transmitted when a key is being released is called a break code.

For example, if "S" is pressed while "A" is already being pressed, a scan code "1B" is transmitted from the key input unit 107.

On the other hand, when the USB key code is used, the "state" of being pressed is transmitted. Accordingly, in this case, two values "07 04" and "07 16" are consecutively transmitted.

Upon storage of the information, which is transmitted from the key input unit 107, in the key input storage unit 1063 (when the key input storage unit 1063 is no longer empty), the interrupt generation unit 1064 generates an interrupt to the CPU 101, requesting the CPU 101 to read the information in the key input storage unit 1063.

Having received the interrupt indicating the request to read the information in the key input storage unit 1063, the interrupt receiving unit 1014 notifies the software on the CPU 101 of the interrupt. The notified software reads the information in the key input storage unit 1063 until the key input storage unit 1063 is empty, converts the read scan code or USB key code to a format, such as an ASCII code, which are used when applications handle characters, and outputs the converted code to the applications.

The decoy immediate storage unit 1061 is a storage device which is configured such that the protected domain 1012 can designate an immediate value which is to be used as a decoy key input value, and includes the first storage unit 10611 and the second storage unit 10612.

The first storage unit 10611 is a storage device for storing decoy immediate values which are used to replace the key codes stored in the key input storage unit 1063.

The first storage unit 10611 has a FIFO (First-In First-Out) structure. When the address 0x00 is read from the unprotected domain, data in the first storage unit 10611 are output in the order of being written from the software in the protected domain 1012, from the earliest to the latest. The first storage unit 10611 has a sufficient capacity to store key information which is desired to be used as the decoy, such as, a capacity to store multiple scan codes or USB key codes shown in FIG. 4.

Regarding the capacity, in a case of online banking or internet shopping, 64 bytes are considered to be sufficient in view of character counts of the log-in password of an account and the like. Of course, the capacity can be more than 64 bytes.

The second storage unit 10612 is a storage device which stores information corresponding to control keys such as a shift key and the like which are unlikely to be used for information on credit card numbers.

The information stored in the second storage unit 10612 is used when the information in the first storage unit 10611 becomes empty.

As described above, the key input storage unit 1063 and the first storage unit 10611 are read in synchronization from the unprotected domain 1011 and from the unprotected domain 1011, respectively. However, there may be a case where the user presses more keys than expected by the protected domain 1012.

For example, if the credit card number is a 16-digit number, it is supposed that the user inputs a total of 16 digits as the card number. The user, however, may press a shift key or a function key arranged at the top of the keyboard while entering the card number.

In the first storage unit 10611, 16-digit information is stored as decoy immediate values. In this case, however, 16 keys will be pressed before the user finishes entering the credit card number.

Accordingly, when the user has pressed 16 keys, the 16 decoy immediate values are all read from the first storage unit 10611, which may empty the information stored in the first storage unit 10611. In such a case, after the user has pressed the 17$^{th}$ key, the data stored in the second storage unit 10612 will be output as the decoy immediate value.

Also, there may be a case where the user cancels processing while entering the credit card number. In such a case, part of the decoy values stored in the first storage unit 10611 may be read by malicious software in the unprotected domain 1011. In this case, an interrupt can still be generated on the CPU 101 so as to allow the malicious software in the unprotected domain 1011 to read the decoy values until the end, thereby improving possibility of making the malicious software acquire the decoy values.

Here, a value cay be written into the second storage unit 10612 only by the software in the protected domain 1012.

It should be noted that in the information security apparatus 1, the software in the protected domain 1012 provides all or part of the applications which use services to users of the information security apparatus 1.

Specifically, the software in the protected domain 1012 encrypts the user's personal information that is input from the key input unit 107 of the information security apparatus 1 and transmits the encrypted information to the online stores 31 and 32, or receives the decoy key input information notified from the online stores 31 and 32 and sets the received information to the first storage unit 10611 of the decoy immediate storage unit 106.

1.2 Structures of Online Stores 31 and 32, Payment-Processing Company 4, and Eavesdropper's Apparatus 6

The online stores 31 and 32 are server apparatuses owned by parties who provide the services thereof, which request the payment-processing company 4 to process payment when necessary.

The payment-processing company 4 is a server apparatus owned by the company which processes payment by credit card.

Figure 8:
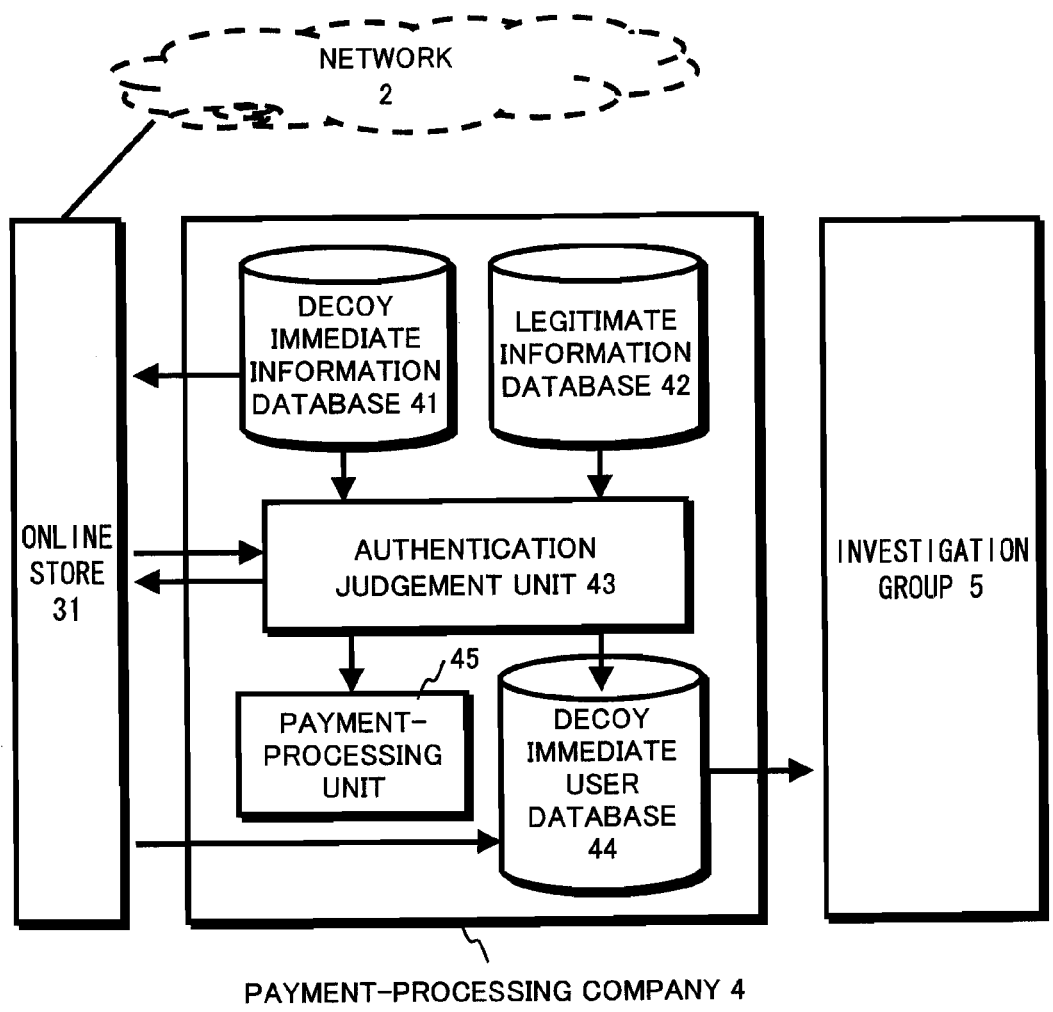
FIG. 8 shows an example of a structure of a payment-processing company of the embodiment of the present invention.

FIG. 8 is a block diagram showing the internal structure of the payment-processing company 4.

The payment-processing company 4 includes the decoy immediate information database 41, a legitimate information database 42, an authentication judgment unit 43, a decoy immediate user database 44, and a payment-processing unit 45.

The decoy immediate information database 41 is a database storing the values which can be used as decoy key input by the key input interface unit 106 of the information security apparatus 1.

Each value which can be used as the decoy key input are transmitted from the payment-processing company 4 in response to a request from the online store 31 when the user using the information security apparatus 1 utilizes services provided by the online stores 31 and 32. After that, the value is notified to the information security apparatus 1 via the network 2.

The legitimate information database 42 stores such as the user's legitimate credit card number used for the above-mentioned payment-processing and the user's birthday.

The decoy immediate user database 44 stores used decoy immediate values and information of the users of the used decoy immediate values.

The payment-processing unit 45 processes payment under the instruction received from the authentication judgment unit 43.

The authentication judgment unit 43 receives, from the online store 31, a payment-processing request regarding the payment-processing.

The payment-processing request includes key input information input from the key input unit 107 when the user performs processing such as payment-processing using the information security apparatus 1.

When information related to payment-processing such as the payment-processing request is communicated via the network 2, a communication including encryption processing such as SSL (Secure Socket Layer) or TLS (Transport Layer Security) is used.

The authentication judgment unit 43 judges whether the key input information included in the payment-processing request is included in the legitimate information database 42 or in the decoy immediate information database 41.

If the key input information is included in the legitimate information database 42, the authentication judgment unit 43 instructs the payment-processing unit 45 to execute the payment-processing on the user as requested by the online store 31.

If the key input information is included in the decoy immediate information database 41, the authentication judgment unit 43 stores, in the decoy immediate user database 44, the values used as the decoy immediate values, which are the key input information.

Also, the authentication judgment unit 43 receives information, held by the online store 31, on the user of the decoy immediate values and stores, in the decoy immediate user database 44, the received information in correspondence with the values used as the decoy immediate values. The information held by the online store 31 may be an IP address of the eavesdropper's apparatus 6 or an IP address of a provider used by the eavesdropper's apparatus 6 to connect to the network, or further may be the address or telephone number of the eavesdropper.

If the key input information is not included in either the legitimate information database 42 or the decoy immediate value information database 41, the authentication judgment 43 prompts the information security apparatus 1 to input information again.

The eavesdropper's apparatus 6 is an apparatus used by the eavesdropper who intends to break into the unprotected domain 1011 of the information security apparatus 1 and acquire key input information.

More specifically, the eavesdropper's apparatus 6 is a personal computer or the like.

2. Operations

In the following, operations of the security system in a case where unauthorized software is incorporated therein will be described.

First, the user starts an e-commerce transaction using such as a browser of the information security apparatus 1.

Following that, in order to input a credit card number, the user selects a window, using the mouse 108, for inputting the credit card number on GUI (Graphical User Interface) of the browser.

Using the selection event of the input window by the user for inputting the credit card number as a trigger, the software in the protected domain sets the immediate value "1234567812345678", which is to be used as the decoy, to the first storage unit 10611 in form of the scan code or USB key code corresponding to the immediate value and sets the decoy immediate output mode (address 0x10) to "1".

Here, the user actually performs key input via the key input unit 107, and information on the performed key input is stored in the key input storage unit 1063.

After that, upon indication of "the address 0x00 is requested to be read" by the register of the address 0x04, which indicates the interrupt generation status, the interrupt generation unit 1064 outputs an interrupt notification signal 1065 indicating an interrupt occurrence to the interrupt receiving unit 1014 of the CPU 101.

In the CPU 101, the interrupt is notified to the unprotected domain 1011 and the protected domain 1012 as a key input event.

As a result, the software in the protected domain 1012 detects the key input event and acquires the information stored in the key input storage unit 1063 by accessing the address 0x00 of the key input interface unit 106.

The acquired information is legitimate information actually input by the user and is used for e-commerce and the like after appropriate encryption processing such as SSL (Secure Socket Layer) is performed thereon in the protected domain.

On the other hand, the unauthorized software in the unprotected domain 1011 detects the key input event and accesses the address 0x00 of the key input interface unit 106.

Here, the information stored in the decoy immediate storage unit 1061 is set to the address 0x00.

Consequently, the unauthorized software acquires, from the register of the address 0x00, not the information input by the user, but the decoy key input value stored in the decoy immediate storage unit 1061.

When the setting of the decoy immediate output mode (address 0x10) is set to "1", there is no legitimate software, on the unprotected domain, using this key input event.

However, being unaware of this fact, the unauthorized software which has broken into the information security apparatus 1 acquires the decoy key input value without knowing this implementation.

The above-mentioned unauthorized software, with use of a communication protocol such as HTTP or FTP, sends the decoy immediate values (i.e. the value stored in the decoy immediate information database 41) acquired by breaking into the information security apparatus 1 to the eavesdropper's apparatus 6 used by the eavesdropper.

After that, recognizing the transmitted information as legitimate personal information (credit card number, etc.) of a user of the information security apparatus 1, the eavesdropper operates the eavesdropper's apparatus 6 to process payment using the acquired information.

The eavesdropper's apparatus 6 transmits the decoy immediate values to the online store 31 or 32.

The online store 31 transmits the decoy immediate values received from the eavesdropper's apparatus 6 to the payment-processing company 4.

The authentication judgment unit 43 of the payment-processing company 4 judges that the key input information included in the payment-processing request is included in the decoy immediate value information database 41 and stores the decoy immediate values, which are used as the key input information, in the decoy immediate user database 44.

Also, the authentication judgment unit 43 receives, from the online store 31, information on the user of the decoy immediate values and stores, in the decoy immediate user database 44, the received information in correspondence with the values used as the decoy immediate values.

Following that, the authentication judgment unit 43 transmits the information held by the online store 31 and the values used as the decoy immediate values to the investigation group 5.

The investigation group 5 receives the information held by the online store 31 and the values used as the decoy immediate values, and with use of the received information, investigates the apparatus used by the eavesdropper.

Use of the above-mentioned security system can increase possibility of tracking the person who breaks into the computer system and attempts to eavesdrop on the key input information.

This is because while eavesdroppers generally try to conceal their own identity carefully when breaking into the information security apparatus 1 or the like, they are less alarmed when enjoying service as legitimate customers of the online store, thus being more likely to leave information which can be used to track their identity.

In addition, according to the prior art, when the information security apparatus 1 is broken into, each user of the information security apparatus 1 needs to take measures within his/her limited range of knowledge. Use of the present invention, however, is advantageous in increasing possibility of the eavesdropper directly accessing an organization such as the payment-processing company or the online store who is expected to have expertise in tracking eavesdroppers.

3. Modifications and Others

Although the present invention has been described by way of the embodiment above, it is to be noted that the present invention is not limited to the embodiment, and naturally, various modifications should be construed as being included therein unless such modifications depart from the scope of the present invention.

(1) Structure of Information Security Apparatus

While the structure of the information security apparatus shown in FIG. 1 is a structure widely employed by personal computers, it is merely an exemplary structure suitable for the embodiment, and does not suggest any limitations of applications or functional scopes of the present invention.

(2) Domain Switching

Regarding domain switching in the above-described embodiment, a "monitor domain" managing temporal switching between the unprotected domain 1011 and the protected domain 1012 may be installed as a lower-level layer which functions as a virtual machine monitor for the higher-level layer (the unprotected domain+the protected domain).

(3) Structure of Domains

The unprotected domain 1011 and the protected domain 1012 may be physically divided among CPU cores, or may be logically divided within a CPU core. In the former case, a plurality of CPU cores exists, and the unprotected domain 1011 and the protected domain 1012 are statically assigned to each of the CPU cores.

(4) Domain Switching Processing

During domain switching processing, it is not necessary to save/restore domains with a large capacity such as the cache and TLB due to time constraints.

For example, hardware can manage each factor such as to which of the unprotected domain 1011 and the protected domain 1012 a cache line belongs, or when the unprotected domain 1011 attempts to refer to a factor belonging to the protected domain 1012, the attempt is determined as a mishit.

In this case, factors of the protected domain 1012 are saved to the main memory, while factors of the unprotected 1011 are restored factor by factor.

(5) Control of Interrupt by Interrupt Receiving Unit 1014

An interrupt from a device can be notified only to the unprotected domain 1011, notified only to the protected domain 1012, or notified to both of them. This can be configured by setting the interrupt receiving unit 1014.

When interrupts occur in the both domains respectively at the same time, processing of one of the interrupts has a static priority. For example, when processing of the interrupt to the protected domain 1012 has the priority, the interrupt to the unprotected domain 1011 is masked during the processing of the interrupt to the protected domain 1012. The masked interrupt to the unprotected domain 1011 is unmasked after the processing of the interrupt to the protected domain 1012 is executed to an interruptible point.

(6) Main Memory

A general-purpose part such as a DRAM (Dynamic Random Access Memory) is often used as the main memory 104, and the main memory protection unit 1021 is often included in the memory controller hub 102. The present invention, however, is not limited to this, and for example, the main memory protection unit 1021 does not need to be included in the memory controller hub 102.

(7) The communication between the key input unit 107 and the I/O controller hub 102 can be performed with use of USB or with use of another type of protocol.

(8) In the present embodiment, only the software which is executed in the protected domain on the CPU 101 can read the legitimate key input value from the key input storage unit 1063. However, the present invention is not limited to this. Definition of what type of software is authorized to acquire the legitimate key input depends on the security policy of the information security apparatus 1. For instance, the authorized software can be identified based on the process number on the CPU, the owner of the process, or an attribute indicating such as the authority of an executable file.

(9) When the setting of the decoy immediate output mode is "1", if an attempt to read an address in the key input storage unit 1063 (0x00 in the example in FIG. 5) is made from the unprotected domain 1011, it is judged that malicious software has broken into the information security apparatus 1, and the CPU 101 is notified of the interrupt. In this case, the CPU 101 can make the software of the protected domain to explicitly recognize which value was read as the decoy, or can display a sentence such as "Decoy value XX was read" on the GUI.

This way, it becomes clear what decoy value the eavesdropper has acquired, making it easier to take measures.

(10) In the above embodiment, the key input interface unit 106 is provided in the I/O controller hub 105. However, the key input interface unit 106 can be provided in the key input unit 107 instead.

In this case, the secure attribute signal 1911 shown in FIGS. 2 and 3 is exposed outside the chip, which thus requires attention. That is to say, when the secure attribute signal 1911 is defined to be HIGH when an access is made from the protected domain 1012, as shown in FIG. 3, a physical attack (such as fixing the voltage so as to force the signal between the chips into the HIGH state) should be assumed possible.

Accordingly, in such a case where a bus with the secure attribute is exposed outside the chip, it is preferable that the contents of the communication be scrambled.

Figure 6:
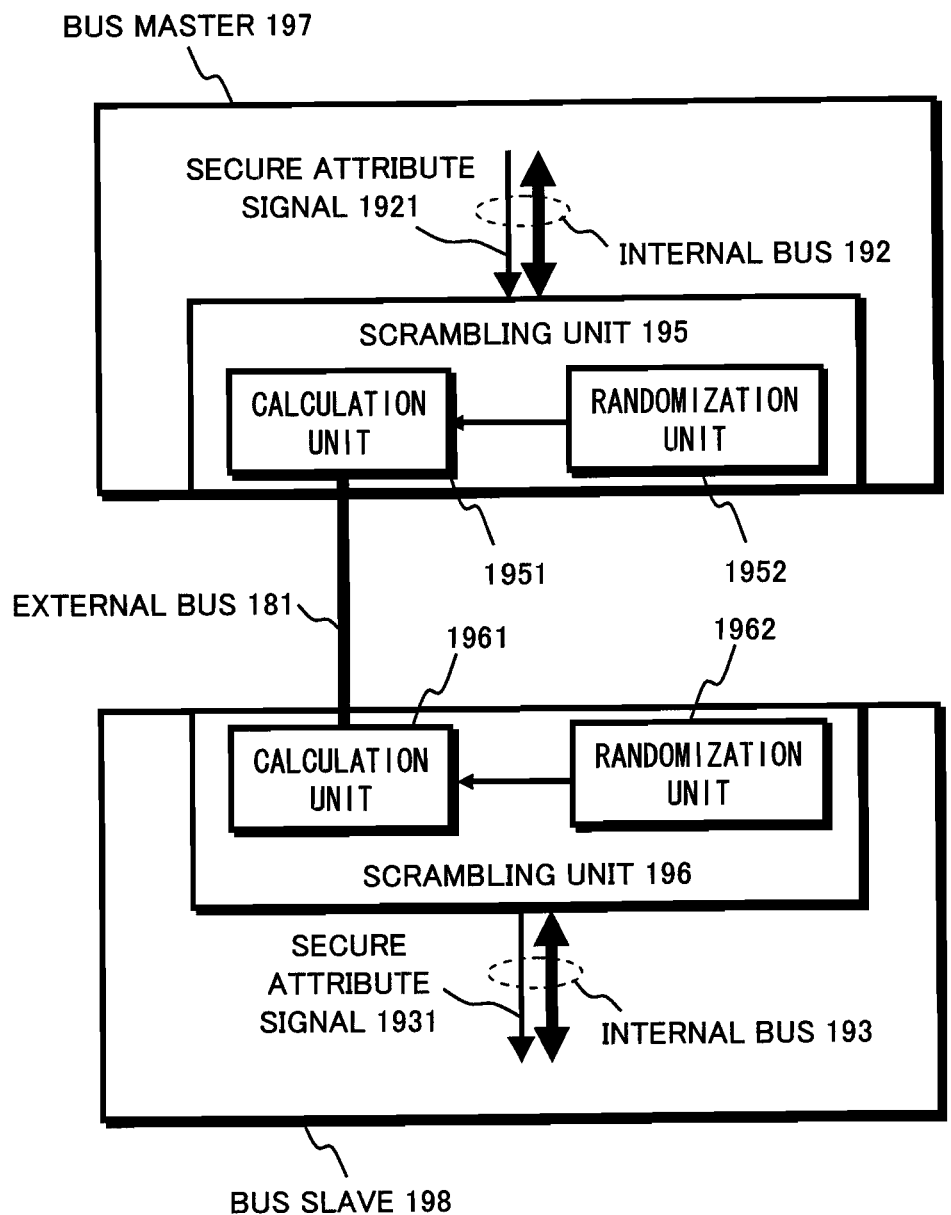
FIG. 6 shows an example of scrambling of buses located outside a chip of the embodiment of the present invention.

FIG. 6 shows an example in which scrambling is performed. The bus master 197 and the bus slave 198 include scrambling units 195 and 196, respectively, and these scrambling units 195 and 196 have randomization units 1952 and 1962, respectively, which output random sequences based on seeds of the same value.

A calculation unit 1951 encrypts all the signals shown in FIG. 3 except for the clock line based on random numbers received from the randomization unit 1952. A calculation unit 1961 performs inversion operations of the calculation unit 1951. This way, operations generated at the internal bus 192 inside the bus master 197 can be generated at the bus slave 198.

This method is applicable to a bus exposed outside the chip, such as the bus between the CPU 101 and the memory controller hub 102 or the bus between the memory controller hub 102 and the I/O controller hub 105.

(11) The present embodiment has described a structure in which a decoy input is set to the key input unit 107. However, another type of input device can be employed as long as the device handles secret information.

Figure 7:
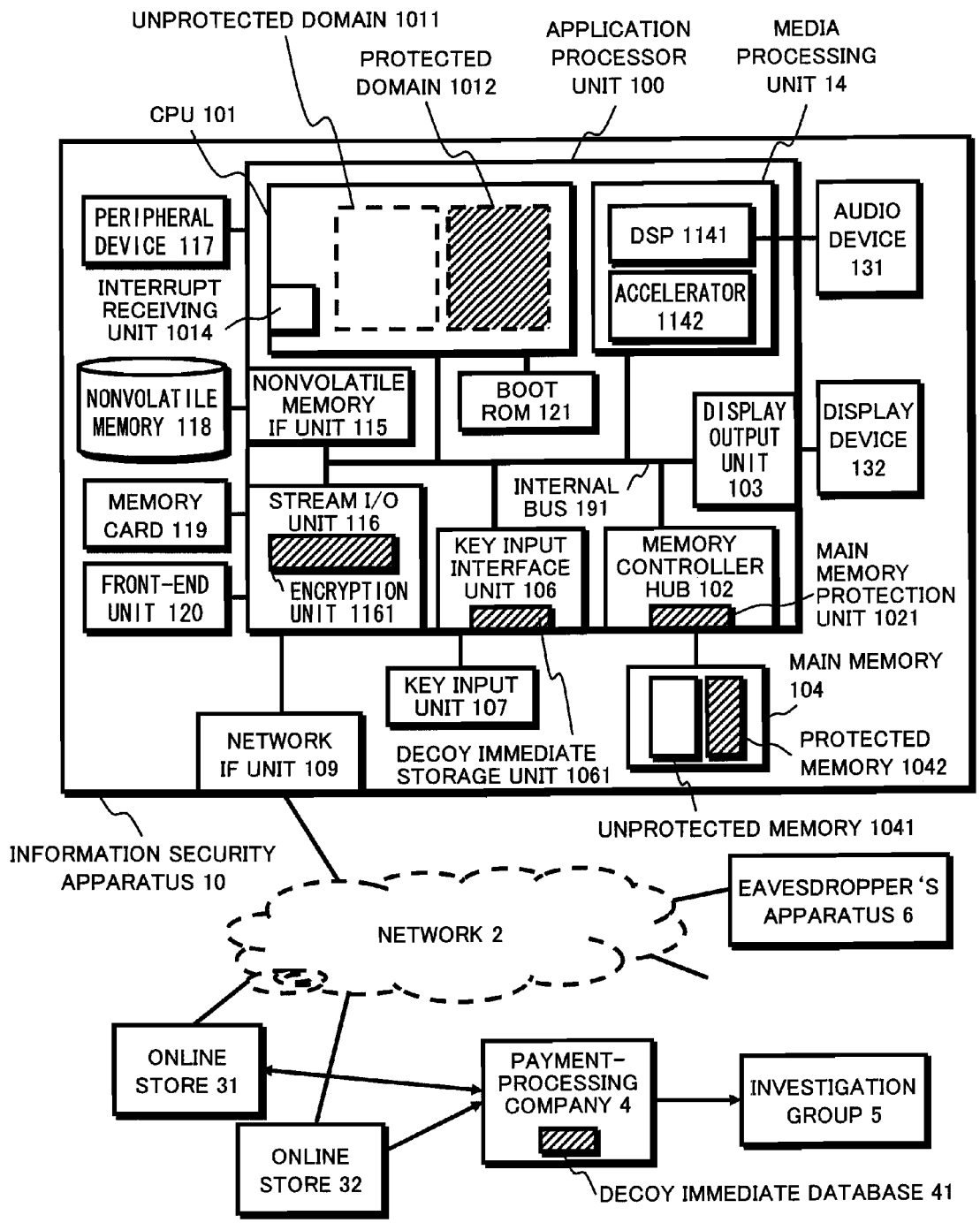
FIG. 7 shows a structure of another embodiment of the present invention.

(12) The information security apparatus 1 shown in FIG. 1 can have a different structure such as a structure shown in FIG. 7.

The structure in FIG. 7 is used in a system using an application processor for a mobile telephone. An application processor unit 100 in FIG. 7 is often packaged as one system LSI.

The CPU 101, the memory controller hub 102, the display output unit 103, the main memory 104, the key input interface 106, and the network IF unit 109 have the same structure as those in FIG. 1.

Being used for the mobile telephone, this information security apparatus has different devices from that in FIG. 1, such as a front-end unit 120 performing a communication with a base-station. However, since these devices are not directly relevant to the present invention, their description is omitted here.

(13) The online stores 31 and 32 can be connected to the payment-processing company 4 by the dedicated line, or can be connected via the network 2.

(14) Sharing customer personal information between the online store 31 or 32 and the payment-processing company 4 may cause legal problems. Thus, it is preferable to assume that the decoy immediate user database 44 be provided to the investigation group 5 which has investigative authority.

(15) In the present embodiment, the online stores 31 and 32 are entities which are independent of the payment-processing company 4. However, the online stores 31 and 32 can be of the same entity as the payment-processing company 4.

(16) The number of factors of the decoy immediate information database 41 can be similar to or smaller than that of the legitimate information database 42. However, it is preferable that the number of the factors of the decoy immediate information database 41 be sufficiently larger than the number of the eavesdroppers.

This is because if this number is too small, a particular immediate value may be revealed to be a "decoy" among the eavesdroppers through information exchange.

Also, each factor of the decoy immediate information database 41 can correspond with each factor of the legitimate information database 31 on one-to-one basis. This method is advantageous in being able to find out which legitimate customer was eavesdropped when decoy immediate values are used by an eavesdropper.

(17) In the present embodiment, decoy values are used as information related to payment processing. However, decoy values can be used as information related to authentication processing such as an account of a password used for logging-in. Or, decoy values can be set to personal information such as an address or telephone number.

(18) In the above description, a series of processing using the present mechanism is performed as a result of receiving the trigger, which is "the selection of the input window on GUI (Graphical User Interface) for inputting the credit card number". However, this is merely an example suitable for the embodiment of the present invention, and a different trigger can be used.

(19) Each of the above-mentioned apparatuses, specifically, is a computer system including a microprocessor, a ROM, a RAM, a hard disk unit, a display unit, a keyboard, a mouse, and the like. Computer programs are stored in the ROM, RAM, or hard disk unit, and each apparatus achieves its predetermined functions as the microprocessor operates in accordance with the computer programs. Here, each computer program is composed of a plurality of command codes that show instructions with respects to the computer, for achieving the predetermined functions.

It should be noted here that each apparatus is not limited to the computer system which includes all of the microprocessor, ROM, RAM, hard disk unit, display unit, keyboard, mouse, and the like, but can be a computer system which includes part of these.

(20) All or part of the compositional elements of each apparatus may be composed from one system LSI (Large Scale Integration). The system LSI is a super-multifunctional LSI on which a plurality of compositional units are manufactured integrated on one chip, and is specifically a computer system that includes a microprocessor, a ROM, a RAM, or the like. Computer programs are stored in the RAM. The LSI achieves its functions by the microprocessor operating according to the computer programs. Each of the components may be individually structured as a single chip, or part or all of the components may be structured as a single chip.

Note that though LSI is used here, the circuit may be variously described as IC, system LSI, super LSI or ultra LSI depending on the level of integration.

Note also that the technique used for the integration does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if a semiconductor technology or related technologies give birth to a new circuit-integrating technology that would replace the LSI, such technologies may be used for integrating the functional blocks. One such possibility is an application of biotechnology.

(21) Part or all of the compositional elements of each apparatus may be composed of a removable IC card or a single module. The IC card or the module is a computer system composed of a microprocessor, a ROM, a RAM, or the like. The IC card or the module may include the aforementioned super-multifunctional LSI. The IC card or the module may achieve its functions by the microprocessor operating according to computer programs. The IC card or the module may be tamper-resistant.

(22) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM (compact disk-read only memory), an MO (magneto-optical), a DVD (digital versatile disk), a DVD-ROM (digital versatile disk-read only memory), a DVD-RAM (digital versatile disk-random access memory), a BD (Blu-ray Disc) or a semiconductor memory, that stores the computer program or the digital signal. Furthermore, the present invention may be the computer program or the digital signal recorded in any of the aforementioned recording medium apparatuses.

Furthermore, the present invention may be the computer program or the digital signal transmitted on a electric communication network, a wireless or wired communication network, or a network of which the Internet is representative.

Furthermore, by transferring the program or the digital signal to the recording medium, or by transferring the program or the digital signal via a network or the like, the program or the digital signal may be executed by another independent computer system.

(23) The present invention may be any combination of the above-described embodiment and modifications.

What is claimed is:

1. An information security apparatus which prevents leakage of input information input by a user using an input device, the information security apparatus comprising:
   a program storage unit storing a protected program and an unprotected program;
   a program execution unit including (i) a protected domain, which is an execution environment of the protected program, and (ii) an unprotected domain, which is an execution environment of the unprotected program;
   an input receiving unit operable to receive, from the input device, input information indicating an instruction to a program being executed by the program execution unit and operable to notify the program execution unit of receipt of input;
   a decoy information storage unit storing decoy information;
   a judgment unit operable to (i) acquire an acquisition request for the input information for which the receipt has been notified to the program execution unit, and (ii) judge whether or not the program, which has output the acquisition request, is being executed in the protected domain; and
   an input control unit operable to, (i) when the judgment unit judges that the program is being executed in the protected domain, output the input information to the program execution unit without change, and (ii) when the judgment unit judges that the program is not being executed in the protected domain, output the decoy information to the program execution unit in replacement of the input information.

2. The information security apparatus of claim 1,
   wherein the input information is a string of characters,
   wherein the decoy information includes a plurality of decoy values, which are arranged in a predetermined order,
   wherein, upon receiving each of the characters included in the input information, the input receiving unit notifies the program execution unit of the receipt of the input information,
   wherein one of the protected program and the unprotected program, which is being executed by the program execution unit, outputs the acquisition request upon the program execution unit being notified of the receipt of the input information by the input receiving unit, and
   wherein the input control unit, (i) when the judgment unit judges that the program is being executed in the protected domain, outputs one character included in the string of characters of the input information to the program execution unit in an input order, and (ii) when the judgment unit judges that the program is not being executed in the protected domain, outputs one of the plurality of decoy values to the program execution unit in accordance with the predetermined order.

3. The information security apparatus of claim 2, wherein, when consecutive characters in the received input information are a predetermined combination indicating an input cancellation, the input receiving unit further notifies the program execution unit of the receipt of the input information a number of times equivalent to a number of remaining decoy values, which have not been output, from among the plurality of decoy values in the decoy information.

4. The information security apparatus of claim 1,
wherein the information security apparatus further comprises an additional information storage unit storing additional information, which is irrelevant to the decoy information, and
wherein, when the received input information includes a control character and a total number of characters in the input information surpasses a number of decoy values included in the decoy information, the input control unit outputs the additional information in accordance with the acquisition request.

5. The information security apparatus of claim 2,
wherein the input device is a keyboard,
wherein each character of the string of characters is a value corresponding to a key, of the keyboard, pressed by the user, and
wherein the decoy information is particular information used to identify an unauthorized user.

6. The information security apparatus of claim 1,
wherein the program execution unit and the judgment unit are connected together via a bus,
wherein the program execution unit attaches attribute information to each predetermined transmission data unit of communication data before transmitting the communication data to the judgment unit, the attribute information indicating whether or not the program being executed is executed in the protected domain, and
wherein the judgment unit determines that the program, which has output the acquisition request, is being executed in the protected domain when, at a time of acquiring the acquisition request, the attribute information indicates that the program is being executed in the protected domain.

7. The information security apparatus of claim 6, wherein, when transmitting the communication data using the bus, the program execution unit and the judgment unit scramble the communication data and the attribute information in an integral manner.

8. The information security apparatus of claim 1,
wherein the judgment unit further receives, from the program execution unit, a write request of new decoy information and, upon receiving the write request, judges whether or not the program being executed by the program execution unit is executed in the protected domain, and
wherein the input control unit, (i) when the program being executed by the program execution unit is judged to be executed in the protected domain at a time of receipt of the write request, further stores the received new decoy information in the decoy information storage unit, and (ii) when the program being executed by the program execution unit is judged to not be executed in the protected domain at the time of receipt of the write request, abandons the received new decoy information.

9. The information security apparatus of claim 1, wherein the input control unit (i) holds output selection information indicating whether or not information to be output can be replaced, (ii) allows only the program execution unit, which is executing the program in the protected domain, to change contents of the output selection information, and (iii) when the contents of the output selection information indicate that the information to be output can be replaced, outputs the input information instead of the decoy information.

10. The information security apparatus of claim 9,
wherein the protected program includes an instruction code, which performs a control such that (i) when the input information is secret information, which needs to be isolated from the unprotected program, the protected program writes the output selection information indicating that the information to be output cannot be replaced, and (ii) when the input information is not secret information, the protected program writes the output selection information indicating that the information to be output can be replaced, and
wherein the program execution unit writes the output selection information to the input control unit in accordance with the protected program.

11. The information security apparatus of claim 1 further comprising a user interface which, when the judgment unit determines that the program is not being executed in the protected domain, indicates that the acquisition request is output by the unprotected program.

12. The information security apparatus of claim 1,
wherein the program execution unit (i) includes a switching mechanism for temporally switching between the protected domain and the unprotected domain and (ii) executes a program in accordance with the domain switched to by the switching mechanism, and
wherein, when a destination of the output of the input control unit is not the program which has output the acquisition request, the input control unit performs the output upon resuming an execution of the program which has output the acquisition request.

13. The information security apparatus of claim 1,
wherein the protected program is pre-authenticated,
wherein the program execution unit includes a protecting mechanism for preventing the unprotected domain from using particular hardware resources,
wherein the protected program uses at least the particular hardware resources, and the unprotected domain uses a hardware resource other than the particular hardware resources, and
wherein the input control unit, when outputting the input information, outputs the input information to the particular hardware resources.

14. The information security apparatus of claim 13, wherein the particular hardware resources include a particular general-purpose register, a particular cache memory, and a particular Translation Look-aside Buffer.

15. A security system comprising an information security apparatus and an online service providing apparatus, the information security apparatus preventing leakage of input information input by a user using an input device, and the online service providing apparatus judging, based on authentication information received from the information security apparatus, whether or not to provide an online service,
wherein the information security apparatus includes:
a program storage unit storing a protected program and an unprotected program;
a program execution unit including (i) a protected domain, which is an execution environment of the protected program, and (ii) an unprotected domain, which is an execution environment of the unprotected program;
an input receiving unit operable to receive, from the input device, input information indicating an instruction to a program being executed by the program execution unit and operable to notify the program execution unit of receipt of input;
a decoy information storage unit storing decoy information;
a judgment unit operable to (i) acquire an acquisition request for the input information for which the receipt has been notified to the program execution unit and (ii) judge whether or not the program, which has output the acquisition request, is being executed in the protected domain;

an input control unit operable to, (i) when the judgment unit judges that the program is being executed in the protected domain, output the input information to the program execution unit without change, and (ii) when the judgment unit judges that the program is not being executed in the protected domain, output the decoy information to the program execution unit in replacement of the input information; and a communication unit operable to transmit, to the online service providing apparatus, information output as the authentication information by the input control unit, and wherein the online service providing apparatus, (i) when receiving the input information as the authentication information, provides the online service, and (ii) when receiving the decoy information as the authentication information, does not provide the online service.

16. The security system of claim 15, wherein the online service providing apparatus further generates new decoy information and transmits the new decoy information to the information security apparatus via a secure communication, wherein the communication unit receives the new decoy information via the secure communication, and wherein the program execution unit writes the new decoy information as the decoy information to the decoy information storage unit in accordance with the protected program.

17. The security system of claim 15, wherein the online service providing apparatus includes an unauthorized terminal storage unit storing, when the online service providing apparatus receives from an external apparatus other than the information security apparatus the decoy information as the authentication information, information on the external apparatus, and wherein the online service providing apparatus does not provide the online service to the external apparatus.

18. The security system of claim 17, wherein the security system further comprises an investigation apparatus related to an investigative organization which identifies an eavesdropper, and wherein the online service providing apparatus transmits the information stored in the unauthorized terminal storage unit to the investigation unit.

19. The security system of claim 15, wherein the online service includes payment-processing of electronic commerce.

20. A method for preventing leakage of input information input by a user using an input device, the method being performed by an information security apparatus, wherein the information security apparatus comprises:
a program storage unit storing a protected program and an unprotected program;

a program execution unit including (i) a protected domain, which is an execution environment of the protected program, and (ii) an unprotected domain, which is an execution environment of the unprotected program; and a decoy information storage unit storing decoy information, and wherein the method for preventing leakage of input information comprises:

an input receiving step of receiving, from the input device, input information indicating an instruction to a program being executed by the program execution unit and of notifying the program execution unit of receipt of input;

a judging step of (i) acquiring an acquisition request for the input information for which the receipt has been notified to the program execution unit and (ii) judging whether or not the program, which has output the acquisition request, is being executed in the protected domain; and an input controlling step of, (i) when the judging step judges that the program is being executed in the protected domain, outputting the input information to the program execution unit without change, and (ii) when the judging step judges that the program is not being executed in the protected domain, outputting the decoy information to the program execution unit in replacement of the input information.

* * * * *